March 5, 1957   D. SANTMYERS   2,784,060
PROCESS FOR PREPARING A POTASSIUM SILICATE SOLUTION
Filed Nov. 25, 1953
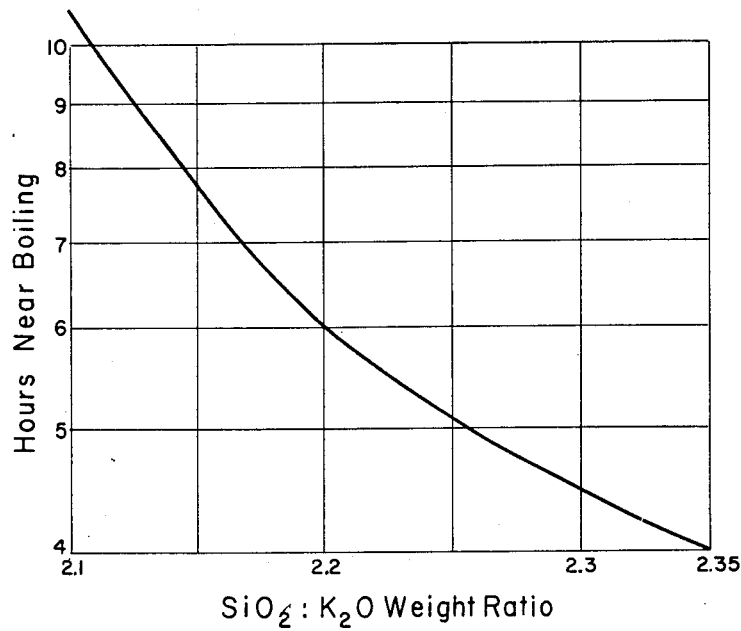
INVENTOR
Donald Santmyers
BY Albert B. Griggs.
ATTORNEY

United States Patent Office 2,784,060
Patented Mar. 5, 1957

2,784,060

PROCESS FOR PREPARING A POTASSIUM SILICATE SOLUTION

Donald Santmyers, La Grange, Ill., assignor to E. I. du Pont de Nemours and Company, Wilmington, Del., a corporation of Delaware Application November 25, 1953, Serial No. 394,345

6 Claims. (Cl. 23—110)

This invention relates to the application of adherent phosphor coatings and is more specifically directed to a novel potassium silicate, to its production, and to processes in which it is used for depositing a phosphor coating.

The novel potassium silicate of the invention is made by adjusting the $SiO_2:K_2O$ ratio with potassium hydroxide and then heating near boiling.

In the drawing there is shown the relation between the ratio of $SiO_2:K_2O$ and the minimum number of hours during which the potassium silicate is held near boiling after adjustment of the ratio.

One method for the formation of a uniform and adherent coating of phosphor particles is to cause the particles to settle from a liquid medium. This method is used in preparing luminescent screens in cathode-ray tubes which are used for television.

The phosphor, or mixture of phosphors, is preferably suspended in an aqueous solution of potassium silicate. The slurry is poured into a television tube and is allowed to settle on to the face of the tube. It is, of course, desirable that the phosphor form a uniform and adherent coating which will remain relatively unimpaired when the liquid is removed and the coating is dried in the course of further processing.

The potassium silicate solution can be added to the tube after an aqueous solution of a suitable salt has already been introduced. There may be in the tube, prior to the addition of the potassium silicate and phosphor, an aqueous solution of barium acetate, barium nitrate, and the like. The phosphor can be added at different times and so can the salt.

The settling process for forming phosphor coatings is old in the art and the specific phosphor used and the specific salts and other additives constitute, per se, no part of the present invention. Further details of suitable such processes and materials will be found in the Journal of Electrochemical Society, volume 99, No. 4, page 164, in an article "Liquid settled luminescent screens" by Pakswer and Intiso. Reference may also be had to the Journal of the Electrochemical Society, volume 95, page 112 (1949), an article by Sadowski titled "The preparation of luminescent screens." It will be understood that the present invention is directed to a novel process for obtaining a phosphor coating of increased wet adhesion by effecting the deposition of the phosphor from the novel potassium silicate solutions herein described.

The potassium silicate which is used as a starting material in processes of the invention will ordinarily have a weight ratio of $SiO_2:K_2O$ of from 2.30:1 to 2.70:1. More specifically it is the preferred commercial practice to use as a starting material a potassium silicate solution having a ratio of 2.5:1 to 2.6:1.

The potassium silicate will ordinarily be dissolved in water to form an aqueous solution. This solution, in accordance with customary practice, will be moderately concentrated to avoid unnecessarily handling quantities of water. Such solutions as supplied commercially contain about twenty-eight percent of potassium silicate by weight on the dry solid basis. Of course, the solutions may be more dilute and they may run down to even the concentrations at which they are used in the settling process, say, 0.5 percent of potassium silicate solids by weight or even less.

The potassium silicate solution used should be relatively free from impurities. It should be of the grade normally supplied to the trade as "Electronic Grade." Ordinarily the industry prefers that the solution have a very low content of such impurities as iron, aluminum, sodium, titanium, and copper. The solution should be free of all foreign matter, in particular organic materials and physical contaminators such as lint and dust. In short, the potassium silicate solution should be as pure and clean as it can economically be made in commercial practice.

According to processes of the invention the ratio of the potassium silicate solution is adjusted to a final weight ratio of $SiO_2:K_2O$ of 2.15:1 to 2.25:1. More specifically it is preferred that the final weight ratio be 2.20:1, or commonly written simply as 2.20.

The potassium hydroxide can be added in any form, but it is ordinarily most convenient to add it as flake caustic potash.

The potassium hydroxide will, of course, be used in an amount to give the desired final $SiO_2:K_2O$ ratio with the particular silicate solution selected as a starting material.

After the ratio has been adjusted as described, the potassium silicate solution is then heated. The temperature is near boiling and the heating process should be effected either under reflux or under pressure. If desired, water lost by evaporation can simply be replaced.

The temperature used will ordinarily be close to, but just below, boiling, say, 95 to 98° C. It will, of course, be understood that somewhat lower temperatures can be used and are substantially equivalent for purposes of the present invention, but they do require a somewhat longer period of treatment.

The potassium silicate solutions are heated according to the invention for a time which is ordinarily in excess of about four and a half to five hours.

More specifically, it will be found that in the settling process a maximum wet-adherence will be obtained with a given ratio of material which has been heated for at least a certain minimum time.

The time of heating at a temperature near boiling, which is required to give a maximum wet-adherence in the preparation of phosphor coatings, is shown in the drawing. In general, it may be concluded that a potassium silicate having a weight ratio of $SiO_2:K_2O$ from 2.15 to 2.25 should be heated near boiling for at least about:

| Hours: | At a weight ratio of |
|---|---|
| 8 | 2.15 |
| 6 | 2.20 |
| 5 | 2.25 |

One may of course determine the minimum time of heating required for intermediate ratios by inter-polation. More simply one may consult the drawing in which the approximate time can be determined by inspection of the curve shown.

The concentration of the potassium silicate solution during the heating process can be substantially that of the starting silicate. It will ordinarily be desirable to use a fairly concentrated solution to avoid the heating and handling of large quantities of water. A solution concentration of about twenty-eight percent of potassium silicate by weight on the dry solids basis is satisfactory.

In the process of forming an adherent phosphor coating the potassium silicate solution prepared as above will ordinarily be diluted before it is used as, for example, by introduction into a television tube. The dilution of the potassium silicate at this point follows the practices current in the industry. Ordinarily, the potassium silicate will be diluted to about 0.5 percent of potassium silicate solids by weight. It can be, of course, somewhat more dilute, say, about 0.3 percent, or somewhat more concentrated, say, about five percent, as desired in accordance with commercial practices.

The phosphors settled according to processes of the present invention may be any of those heretofore used in the art. There may be employed, for example, ZnSCdS, ZnS, ZnCdS, and other commercially available phosphors.

The additives normally employed may be used and there can be included in the settling solution barium nitrate, barium acetate, and other such materials.

In order that the invention may be better understood reference can be had to the following illustrative example.

Example

The starting potassium silicate solution had a weight ratio of $SiO_2:K_2O$ of 2.5. The solution contained twenty-seven percent of potassium silicate by weight.

To this solution there was added flake potassium hydroxide containing seventy-one percent of $K_2O$ by weight. The ratio of $SiO_2:K_2O$ was reduced to 2.20. This required 1.5 parts of the potassium hydroxide for each 100 parts of the silicate solution.

The solution was then heated near boiling, above 95° C. but below 100° C., under reflux for about six hours. It was then cooled to room temperature.

Two hundred and fifty milliliters of the above potassium siliciate solution were diluted with 350 milliliters of demineralized water. To the resulting 600 milliliters of dilute potassium silicate solution there was added 8 grams of du Point phosphor, 24LV7, a commercial blended zinc cadmium sulfide phosphor. The phosphor-silicate slurry was then mixed for five minutes.

The phosphor-silicate slurry was then introduced into a twenty-one inch television picture tube containing, as a water cushion, 14 liters of barium acetate solution having a concentration of 0.04 percent of barium acetate by weight.

The phosphor was allowed to settle for fifteen minutes to form a uniform, adherent film on the face of the television tube. The aqueous system was thereafter removed from the tube and the coating was dried.

I claim:

1. A process for preparing a potassium silicate solution adapted for use as a suspending and cementing agent for phosphors in making television picture tubes, the steps comprising adding potassium hydroxide to an aqueous solution of potassium silicate having a weight ratio of $SiO_2:K_2O$ of 2.30 to 2.70 to adjust the ratio to 2.15 to 2.25, heating at a temperature above 95° C. and below 100° C. for at least about five hours.

2. A process for preparing a potassium silicate solution adapted for use as a suspending and cementing agent for phosphors in making television picture tubes, the steps comprising adding potassium hydroxide to an aqueous solution of potassium silicate having a weight ratio of $SiO_2:K_2O$ of 2.30 to 2.70 to adjust the ratio to 2.15 to 2.25, heating at a temperature above 95° C. and below 100° C. for at least about:

| Hours: | At a weight ratio of |
|---|---|
| 8 | 2.15 |
| 6 | 2.20 |
| 5 | 2.25 |

3. A process for preparing a potassium silicate solution adapted for use as a suspending and cementing agent for phosphors in making television picture tubes, the steps comprising adding potassium hydroxide to an aqueous solution of potassium silicate having a weight ratio of $SiO_2:K_2O$ of 2.5 to 2.6 to adjust the ratio to about 2.20, heating at a temperature above 95° C. and below 100° C. for about six hours.

4. The potassium silicate solution prepared according to claim 1.

5. The potassium silicate solution prepared according to claim 2.

6. The potassium silicate solution prepared according to claim 3.

References Cited in the file of this patent

UNITED STATES PATENTS

| | | |
|---|---|---|
| 1,487,471 | Plonnis | Mar. 18, 1924 |
| 1,942,299 | Lemmerman et al. | Jan. 2, 1934 |
| 1,953,840 | Waddell | Apr. 3, 1934 |
| 2,250,189 | Bachman | July 22, 1941 |
| 2,451,590 | Tidik et al. | Oct. 19, 1948 |